United States Patent [19]
Yoshida

[11] Patent Number: 6,016,387
[45] Date of Patent: *Jan. 18, 2000

[54] FACSIMILE RECORDING APPARATUS AND METHOD WHICH STORES RECEIVED INFORMATION AND RECORDS WHEN THE AMOUNT OF STORED INFORMATION REACHES A PREDETERMINED VALUE

[75] Inventor: Takehiro Yoshida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/873,713

[22] Filed: Jun. 12, 1997

Related U.S. Application Data

[63] Continuation of application No. 08/351,648, Dec. 7, 1994, abandoned.

[30] Foreign Application Priority Data

Dec. 10, 1993 [JP] Japan .................................. 5-341273

[51] Int. Cl.[7] .................................................. H04N 1/32
[52] U.S. Cl. ........................ 395/115; 358/296; 358/404; 358/442; 358/468
[58] Field of Search ............................ 358/400, 404–406, 358/434–437, 440, 442, 468, 475, 444; 395/113–116; H04N 1/00, 1/32

[56] References Cited

U.S. PATENT DOCUMENTS

| | | | |
|---|---|---|---|
| 4,907,094 | 3/1990 | Mishima et al. | 358/437 |
| 4,952,972 | 8/1990 | Someya | 358/475 |
| 5,057,941 | 10/1991 | Moriya | 358/440 |
| 5,075,783 | 12/1991 | Yoshida et al. | 358/439 |
| 5,126,850 | 6/1992 | Kato | 358/406 |
| 5,155,602 | 10/1992 | Terajima . | |
| 5,177,620 | 1/1993 | Fukushima | 358/468 |
| 5,194,967 | 3/1993 | Nonomura | 358/468 |
| 5,208,681 | 5/1993 | Yoshida | 358/404 |
| 5,216,520 | 6/1993 | Omura et al. | 358/468 |
| 5,227,894 | 7/1993 | Yoshida | 358/441 |
| 5,237,428 | 8/1993 | Tajitsu et al. | 358/437 |
| 5,325,209 | 6/1994 | Manabe | 358/437 |
| 5,386,303 | 1/1995 | Kihara | 358/405 |
| 5,481,374 | 1/1996 | Tachbane et al. | 358/404 |
| 5,483,353 | 1/1996 | Kudou | 358/404 |
| 5,508,819 | 4/1996 | Yanagisawa | 358/404 |
| 5,510,907 | 4/1996 | Koichi | 358/440 |

*Primary Examiner*—Kim Yen Vu
*Attorney, Agent, or Firm*—Fitzpatrick, Cella, Harper & Scinto

[57] ABSTRACT

A facsimile apparatus which records received information on a recording sheet includes a recorder that has an active mode and a standby mode using less electric power than the active mode. With the recorder in the standby mode, the received information is stored in a memory without being recorded until a detector detects that the amount of stored information has reached a predetermined value. At such time, the mode of the recorder is changed to the active mode to cause the recorder to record the stored information.

34 Claims, 17 Drawing Sheets

FACSIMILE RECORDING APPARATUS AND METHOD WHICH STORES RECEIVED INFORMATION AND RECORDS WHEN THE AMOUNT OF STORED INFORMATION REACHES A PREDETERMINED VALUE

This application is a continuation of application Ser. No. 08/351,648 filed Dec. 7, 1994 abandoned.

BACKGROUND OF THE INVENTION

1. Field of the Invention

The present invention relates to a facsimile apparatus and, more particularly, to a facsimile apparatus which records received information stored in a memory all together.

2. Related Background Art

In a conventional facsimile apparatus, received information is basically immediately recorded such that the information is simultaneously recorded with start of reception, or the information is recorded upon completion of reception of one page. That is, the facsimile apparatus has instantaneity as its primary importance.

There has been proposed a facsimile apparatus in which image data received at night when no operator is present is stored in a memory and recorded not at that time but in the morning. Also in this facsimile apparatus, image data received during daytime is recorded in real time.

In the conventional facsimile apparatus, received information is basically immediately recorded, so that instantaneity is sufficiently ensured.

In such a facsimile apparatus, however, power saving cannot be effectively achieved. For example, there is a facsimile apparatus which performs surf (Surface Rapid Fusing)-fixing recording (a fixing unit is not normally supplied with power but energized at the time of recording) suitable for power saving. Even in this facsimile apparatus, if information corresponding to one page is received every 20 minutes, preheat for recording is performed every 20 minutes. Upon completion of recording of one page, preheat is canceled.

Surf-fixing recording will be briefly described. Most of conventional facsimile apparatuses employ a heat roller fixing unit constituted by a fixing roller having a large heat capacity and a halogen lamp arranged in the fixing roller. In surf-fixing recording, in place of these components, a thin fixing film and a heater having a small heat capacity pressed against the fixing film are used. With this arrangement, preheat of the heater during waiting becomes unnecessary, thereby achieving power saving. This is because a time for preheat from the room temperature to a recording allowable temperature is decreased as compared to the conventional heat roller fixing unit. More specifically, in surf-fixing, the time for preheat from the room temperature to the recording allowable temperature is as short as about six seconds. Therefore, if a record state can be set within this time period, preheat of the heater during waiting is not needed. As described above, surf-fixing recording is effectively used as a recording means because power can be saved during waiting. However, in the above-described recording of received information, preheat is performed before recording of one page, and thereafter, the information corresponding to one page is recorded. In addition, the temperature of the heater is decreased in 20 minutes. Before recording of the next page, the heater must be preheated again. For this reason, preheat for real-time recording is performed every time information is received.

SUMMARY OF THE INVENTION

It is an object of the present invention to improve a facsimile apparatus.

It is another object of the present invention to provide a facsimile apparatus which saves power necessary for outputting received information stored in a memory.

DETAILED DESCRIPTION OF THE PREFERRED EMBODIMENTS

The present invention will be described below in detail on the basis of embodiments shown in the accompanying drawings.

First Embodiment

Figures 1, 1A:
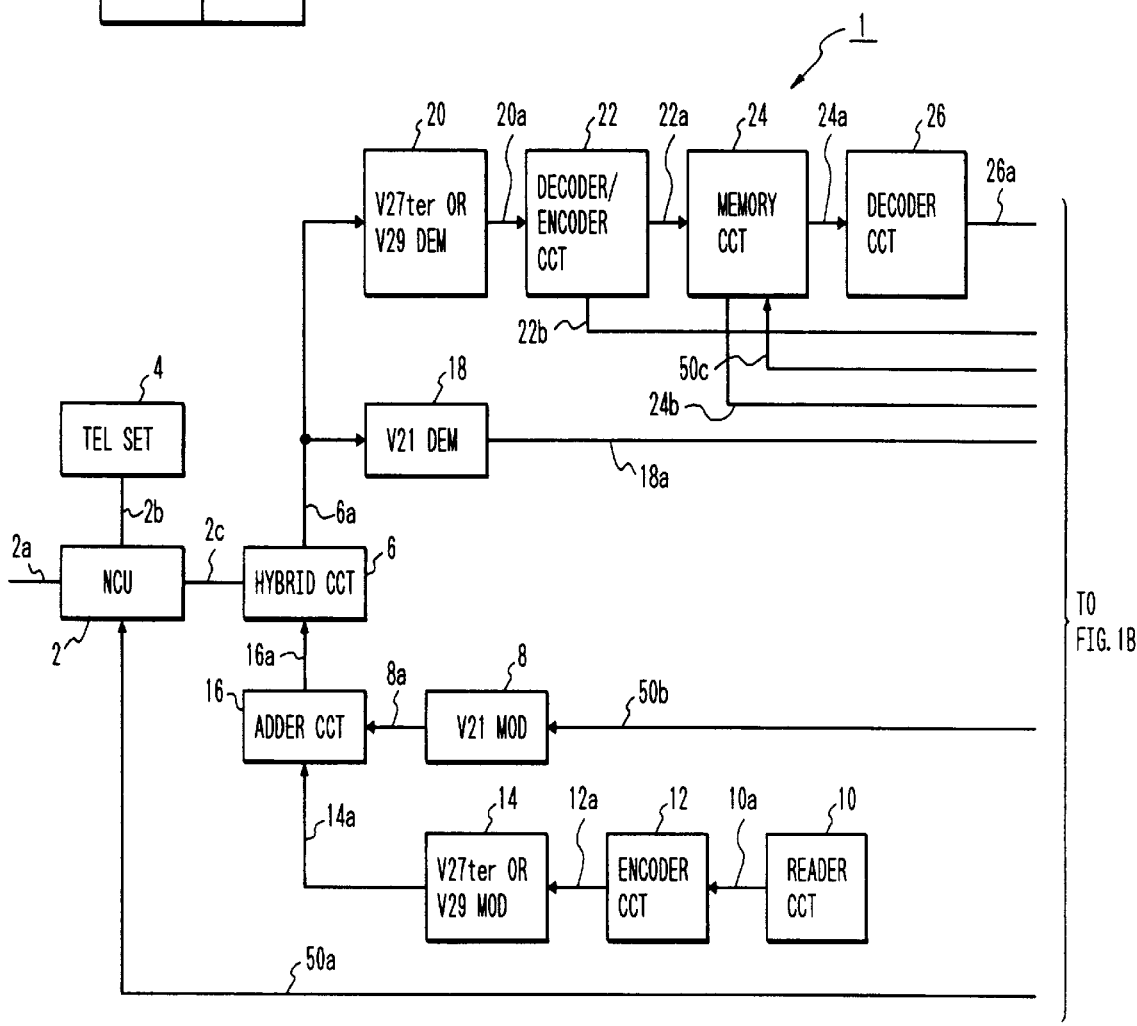
FIG. 1 is comprised of FIGS. 1A and 1B and it is a block diagram showing the arrangement of a facsimile apparatus according to the first embodiment of the present invention.
Figure 1B:
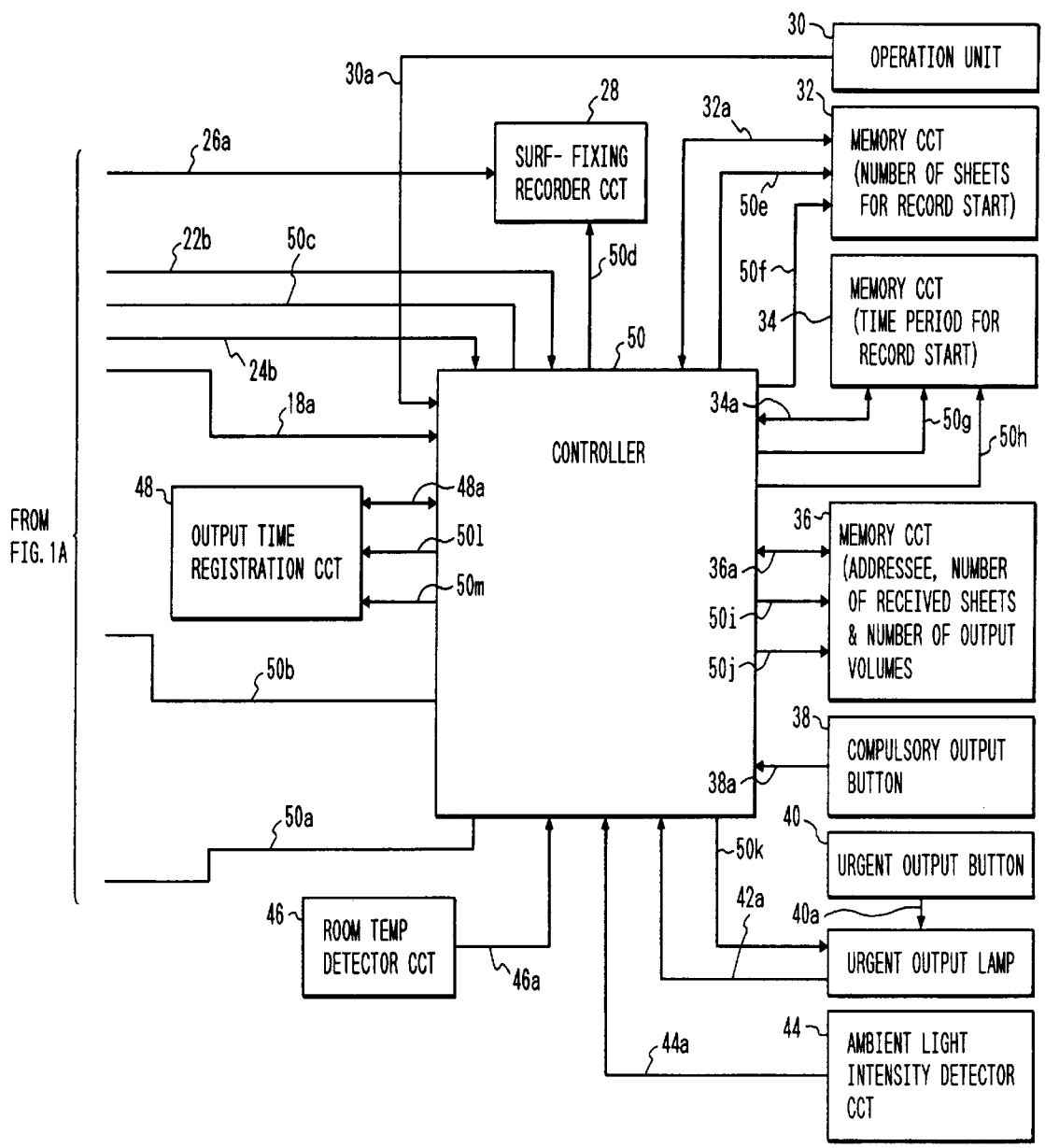

FIGS. 1A and 1B show block diagrams illustrating the arrangement of a facsimile apparatus according to the first embodiment of the present invention. The arrangement of each portion of a facsimile apparatus 1 of this embodiment will be described below. An NCU (Network Control Unit) 2 is connected to a terminal of a telephone line to use a telephone network for, e.g., data communications, executes connection control of a telephone switching network, performs switching to a data communication path, and holds a loop. A signal line 2a connected to the NCU 2 serves as a telephone line. Upon reception of a signal on a signal line 50a, if the signal level of the signal is "0", the NCU 2 connects the telephone line to a telephone set 4, i.e., connects the signal line 2a to a signal line 2b. When the signal level of a signal on the signal line 50a is "1", the NCU 2 connects the telephone line to the facsimile apparatus, i.e., connects the signal line 2a to a signal line 2c. In a normal state, the telephone line is connected to the telephone set side.

A hybrid circuit 6 for separating transmission-system signals and reception-system signals is connected to the NCU 2 through the signal line 2c. A transmission signal on a signal line 16a is sent onto the telephone line via the signal line 2c and the NCU 2. A signal sent from a partner station through the signal line 2a serving as a telephone line is output to a signal line 6a via the NCU 2 and the signal line 2c.

A modulator 8 performs modulation based on the CCITT (International Telegraph and Telephone Consultative Committee) recommendation V21. The modulator 8 receives and modulates a protocol signal on a signal line 50b, and outputs the modulated data onto a signal line 8a.

A reader circuit 10 is constituted by an image pickup element such as a CCD (Charge-Coupled Device), and an optical system. The reader circuit 10 sequentially reads image signals for one main scan line from a transmission original, and generates a signal train representing two values, i.e., black and white. The signal train of the binary data of black and white is output onto a signal line 10a.

An encoder circuit 12 receives read data output onto the signal line 10a and outputs the data which is encoded (by MH (Modified Huffman) or MR (Modified READ) encoding) onto a signal line 12a.

A modulator 14 performs modulation based on the CCITT recommendation V27ter (differential phase modulation) or V29 (quadrature modulation). The modulator 14 receives and modulates a signal on the signal line 12a and outputs the modulated data onto a signal line 14a.

An adder circuit 16 receives signals from the signal lines 8a and 14a and outputs the sum data onto a signal line 16a.

A demodulator 18 performs demodulation based on the CCITT recommendation V21. The demodulator 18 receives and demodulates a signal from the signal line 6a, performs demodulation based on the V21, and outputs the demodulated data onto a signal line 18a.

A demodulator 20 performs demodulation based on the CCITT recommendation V27ter (differential phase modulation) or V29 (quadrature modulation). The demodulator 20 receives and demodulates a signal on the signal line 6a and outputs the demodulated data onto a signal line 20a.

A decoder/encoder circuit 22 receives and temporarily decodes data output onto the signal line 20a and outputs the decoded data onto a signal line 22b. At the same time, this data is encoded by MR (Modified READ) encoding with k=8 and output onto a signal line 22a.

A memory circuit 24 stores the demodulated data output onto the signal line 22a in accordance with a control signal on a signal line 50c. The memory circuit 24 also outputs the data stored in accordance with the control signal on the signal line 50c onto a signal line 24a. The memory circuit 24 also outputs the usable empty area onto a signal line 24b in units of Kbytes. A decoder circuit 26 receives a signal output onto the signal line 24a and outputs the data decoded (by MH (Modified Huffman) decoding or MR (Modified READ) decoding) onto a signal line 26a.

A surf-fixing recorder circuit (LBP) 28 receives a signal on a signal line 50d. If the signal level is "0", a waiting state is set. If the signal level is "1", preheat for recording is performed. If the signal level is "2", data output onto the signal line 26a is received to sequentially perform surf-fixing recording of one line.

An operation unit (or console unit) 30 includes a start key, a ten-key pad, a one-touch dialing key, an abbreviated dialing key, a registration key (number of sheets for record start), a registration key (time period for record start even with a short number of sheets), and an output time registration key. The operation unit 30 outputs information corresponding to a depressed key onto a signal line 30a.

A memory circuit (number of sheets for record start) 32 registers the number of sheets as predetermined. When the received information stored in the memory circuit 24 exceeds the number of sheets registered in the memory circuit (number of sheets for record start) 32, recording is started. When the number of sheets is to be stored in the memory circuit (number of sheets for record start) 32, a controller 50 outputs the number of sheets (e.g., 50) onto a signal line 32a, and thereafter, supplies a write pulse onto a signal line 50e. When the number of sheets stored in the memory circuit (number of sheets for record start) 32 is to be read out, the controller 50 supplies a read pulse onto a signal line 50f. Upon reception of the read pulse from the controller 50, the memory circuit (number of sheets for record start) 32 outputs the stored number of sheets (e.g., 50) onto the signal line 32a.

A memory circuit (time period for record start) 34 stores a time period as predetermined. If received information exceeding the number of sheets is not stored in the memory circuit 24, recording is started after the elapse of a predetermined time period from the latest recording. When a time period is to be stored in the memory circuit (time period for record start) 34, the controller 50 outputs a time period (e.g., 120 minutes) onto a signal line 34a, and thereafter, supplies a write pulse onto a signal line 50g. When the time period stored in the memory circuit (time period for record start) 34 is to be read out, the controller 50 supplies a read pulse onto a signal line 50h. Upon reception of the read pulse from the controller 50, the memory circuit (time period for record start) 34 outputs the stored time period (e.g., 120 minutes) onto the signal line 34a.

A memory circuit (addressee, number of received sheets, and number of output volumes) 36 stores an addressee, the number of received sheets, and the number of output volumes in correspondence with the communication number of received information stored in the memory circuit 24. When an addressee, the number of received sheets, and the number of output volumes are to be stored in the memory circuit (addressee, number of received sheets, and number of output volumes) 36, the controller 50 outputs the following protocol signal, i.e., a character signal represented by, e.g., a communication number (e.g., 1223), a space, an addressee on a receiver station side (e.g., 25H as a sub-address corresponding to FFH from 00H), a space, the number of received sheets (e.g., 11), a space, and the number of output volumes (e.g., 1) in the order named onto a signal line 36a, and supplies a write pulse onto a signal line 50i. When information stored in the memory circuit (addressee, number of received sheets, and number of output volumes) 36 is to be read out, the controller 50 outputs the communication number (e.g., 1223) onto the signal line 36a, and thereafter, supplies a read pulse onto a signal line 50j. The memory circuit (addressee, number of received sheets, and number of volumes) 36 outputs the information stored in correspondence with the communication number as a character signal represented by, e.g., the addressee on the receiver station side (e.g., sub-address 25H), a space, the number of received sheets (e.g., 11), a space, and the number of output volumes (e.g., 1) in the order named onto the signal line 36a.

A compulsory output button 38 is depressed to forcibly record received information stored in the memory circuit 24. When the compulsory output button 38 is depressed, a pulse is generated onto a signal line 38a.

An urgent output button 40 is depressed to immediately output to-be-transmitted information on the receiver side. When the urgent output button 40 is depressed, a pulse is supplied onto a signal line 40a.

An urgent output lamp 42 is turned on in transmission assuming that to-be-transmitted information is immediately output. When a clear pulse is supplied onto a signal line 50k, the urgent output lamp 42 is turned off. Every time a pulse is supplied onto the signal line 40a, the urgent output lamp 42 is repeatedly turned on and off. The urgent output lamp 42 outputs a signal of level "0" onto a signal line 42a upon turning off, and a signal of level "1" onto the signal line 42a upon turning on.

An ambient light intensity detector circuit 44 detects an ambient light intensity near the facsimile apparatus 1. In outputting a signal according to the ambient light intensity onto a signal line 44a, the ambient light intensity detector circuit 44 outputs a signal of level "1" at the highest light intensity and a signal of level "0" at the lowest light intensity. At an intermediate light intensity, an analog value from "0" to "1" is output. A room temperature detector circuit 46 detects a room temperature near the facsimile apparatus 1. The room temperature detector circuit 46 outputs temperature information onto a signal line 46a.

An output time registration circuit 48 registers a time for outputting received information. When a time is to be registered in the output time registration circuit 48, the controller 50 outputs a character signal represented by a time (e.g., 8:00), a space, a time (e.g., 10:00), a space, a time (e.g., 12:00), a space, a time (e.g., 14:00), a space, a time (e.g., 16:00), a space, a time (e.g., 18:00), a space, and a time (e.g., 20:00) in the order named onto a signal line 48a, and thereafter, supplies a write pulse onto a signal line 50l. When a plurality of times registered in the output time registration circuit 48 are to be read out, a read pulse is supplied onto a signal line 50m. Upon reception of the read pulse from the controller 50, the output time registration circuit 48 outputs a protocol signal represented by 8:00, a space, 10:00, a space, 12:00, a space, 14:00, a space, 16:00, a space, 18:00, a space, and 20:00 onto the signal line 48a as time information registered in the output time registration circuit 48.

The controller 50 has a function of storing received information in the memory circuit 24 and subsequently stores received information in the memory circuit 24. When received information exceeding the number of sheets is stored in the memory 24, the controller 50 controls to record the received information at once. The number of sheets is registered in the memory circuit (number of sheets for record start) 32 by the operation unit 30.

Figure 2:
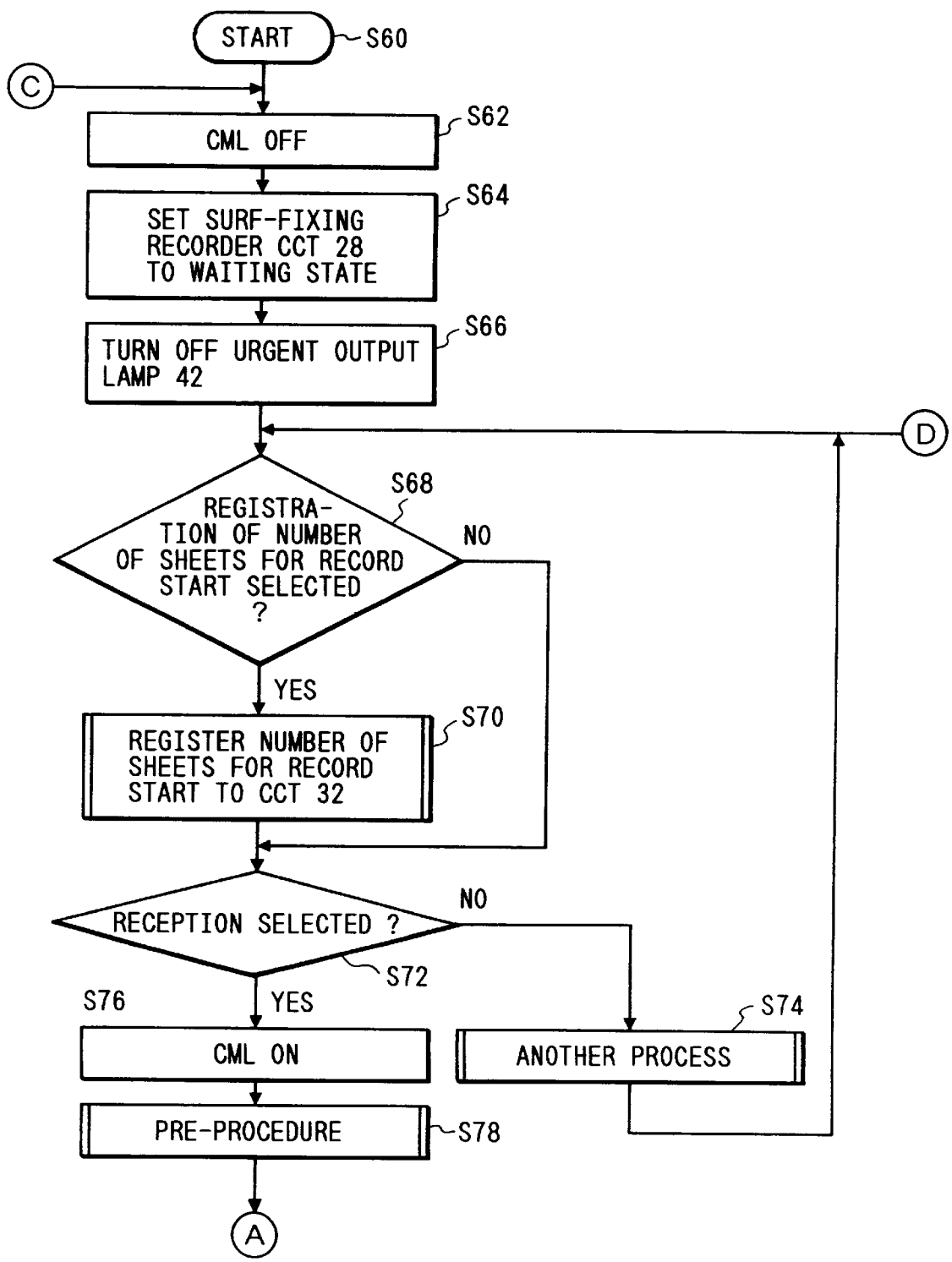
FIG. 2 is a flow chart showing facsimile transmission/reception control executed by a controller 50.
Figure 3:
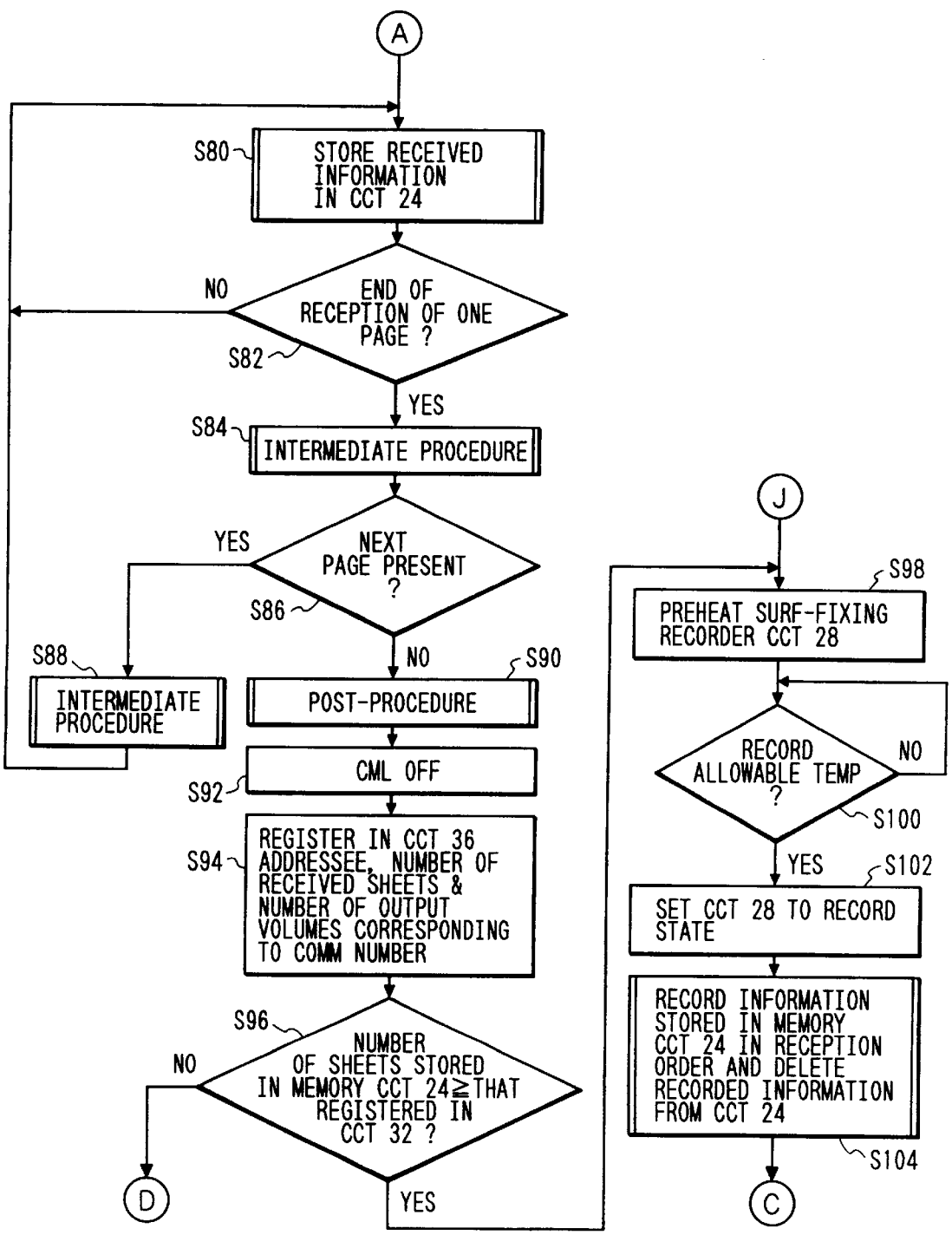
FIG. 3 is a flow chart showing facsimile transmission/reception control executed by the controller 50.

FIGS. 2 and 3 are flow charts showing a facsimile transmission/reception control routine executed by the controller 50.

The controller 50 outputs a signal of level "0" onto the signal line 50a to turn off a CML serving as a relay in the NCU 2 (step S62). A signal of level "0" is output onto the signal line 50d to set the surf-fixing recorder circuit 28 to the waiting state (step S64). A clear pulse is generated onto the signal line 50k to turn off the urgent output lamp 42 (step S66). It is determined whether registration of the number of sheets for record start of image data stored in the memory circuit 24 is selected by the operation unit 30 (step S68). If YES in step S68, the flow advances to step S70 to register the number of sheets for record start in the memory circuit (number of sheets for record start) 32; otherwise, the flow advances to step S72.

In step S72, it is determined whether reception is selected. If YES in step S72, a signal of level "1" is output onto the signal line 50a to turn on the CML; otherwise, another process is executed (step S74).

The controller 50 performs a pre-procedure to store received information in the memory circuit 24 (step S78).

The controller 50 outputs a command through the signal line 50c to store the received information in the memory circuit 24 (step S80).

The controller 50 determines whether reception of one page is ended (step S82). If YES in step S82, the controller 50 continuously performs an intermediate procedure to store the received information in the memory circuit 24 (step S84).

The controller 50 determines whether the next page is present (step S86). If YES in step S86, the intermediate procedure is executed (step S88), and the flow returns to step S80; otherwise, the flow advances to step S90 to execute a post-procedure.

The controller 50 outputs a signal of level "0" onto the signal line 50a to turn off the CML (step S92). The controller 50 registers in the memory circuit (addressee, number of received sheets, and number of output volumes) 36 an addressee, the number of received sheets, and the number of output volumes corresponding to the communication number (step S94).

It is determined whether the number of sheets of the received information stored in the memory circuit 24 exceeds that registered in the memory circuit (number of sheets for record start) 32 (step S96). If YES in step S96, a signal of level "1" is output onto the signal line 50d to preheat the surf-fixing recorder circuit 28 (step S98).

The surf-fixing recorder circuit 28 is preheated in step S98, and it is determined whether a record allowable temperature is set (step S100). If YES in step S100, a signal of level "2" is output onto the signal line 50d to set the surf-fixing recorder circuit 28 to a record state (step S102).

The controller 50 outputs a control signal via the signal line 50c to record the received information stored in the memory circuit 24 in the reception order (step S104). The recorded information is deleted from the memory circuit 24.

Second Embodiment

A facsimile apparatus of the second embodiment will be described below. The facsimile apparatus of the second embodiment has the same arrangement as that of the first embodiment. In the facsimile apparatus 1 of the first embodiment, it is determined whether the number of sheets of the received information stored in the memory circuit 24 exceeds the number of sheets for record start every time one communication is ended. In the second embodiment, however, every time received information corresponding to one page is stored in a memory circuit 24, it is determined whether the number of sheets stored in the memory circuit 24 exceeds the number of sheets for record start. If YES, a surf-fixing recorder circuit 28 is preheated. After preheating, recording is started. Reception is continued during recording. Upon completion of reception, all the received information left in the memory circuit 24 is recorded.

Figure 4:
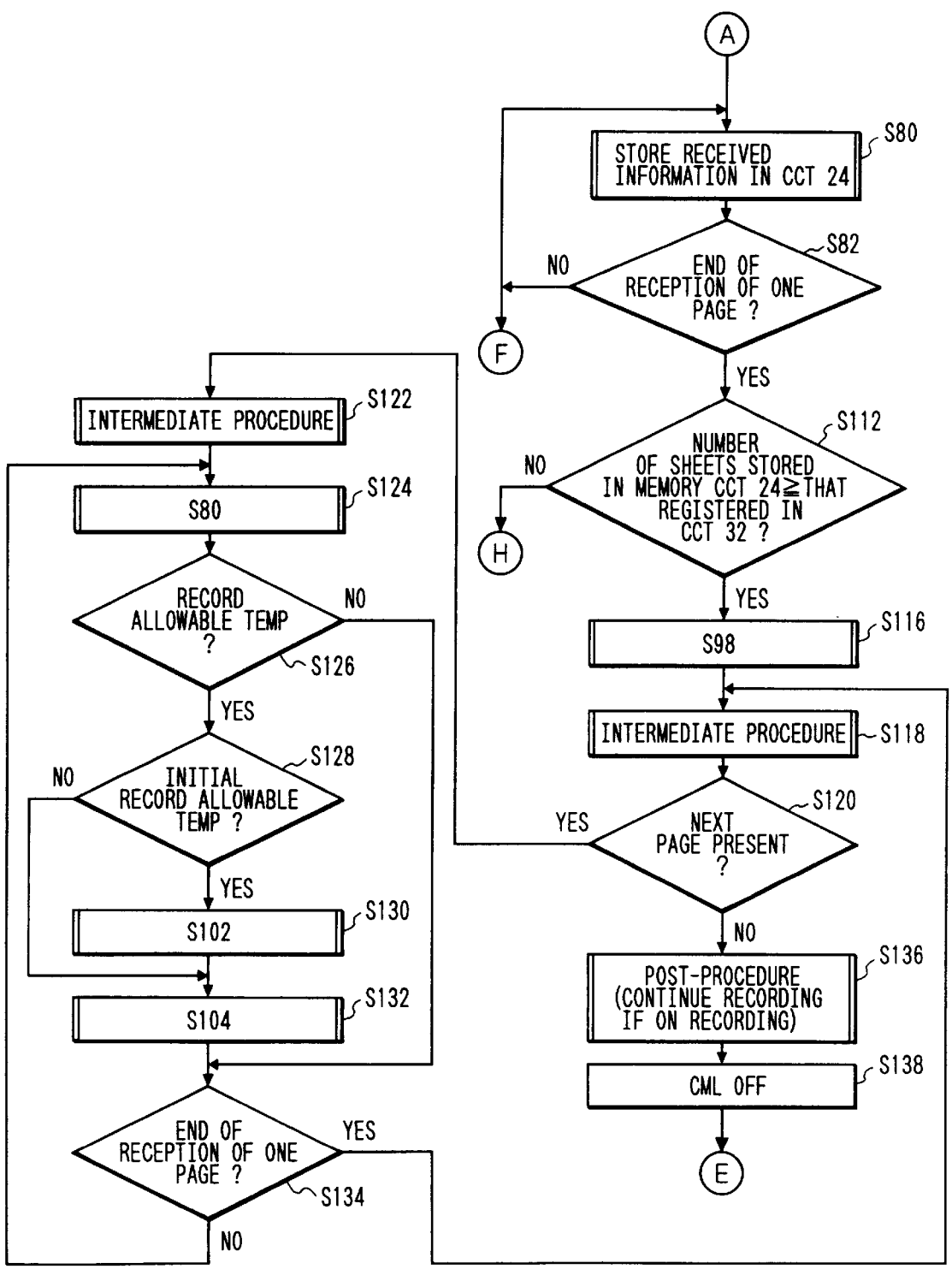
FIG. 4 is a flow chart showing part of a facsimile transmission/reception control routine of the second embodiment.
Figure 5:
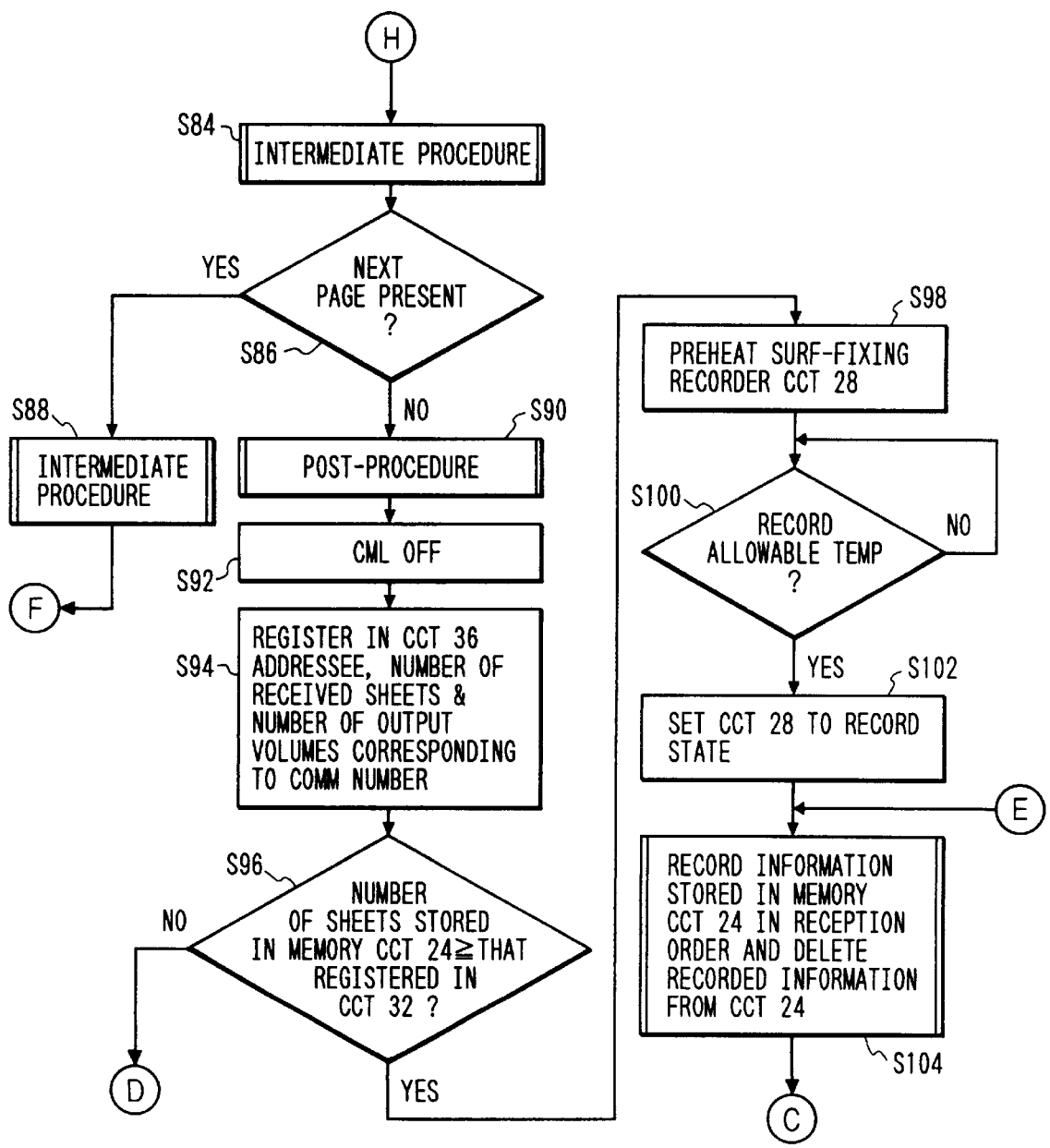
FIG. 5 is a flow chart showing part of the facsimile transmission/reception control routine subsequent to FIG. 4.

FIGS. 4 and 5 are flow charts showing part of a facsimile transmission/reception control routine of the second embodiment. This routine is realized by replacing steps S84 to S102 of the first embodiment with steps S110 to S138 shown in FIG. 4. The same step numbers as those of the first embodiment represent the same processes, and a detailed description thereof will be omitted.

Referring to FIG. 4, if YES in step S82 of the first embodiment, i.e., if information corresponding to one page is received, it is determined whether the number of received sheets stored in the memory circuit 24 exceeds the number of sheets registered in a memory circuit (number of sheets for record start) 32 (step S112). If NO in step S112, the flow advances to step S84 to perform the same process as described in the first embodiment; otherwise, the flow advances to step S116. In step S116, as control with the same content as that in step S98 of the first embodiment, the surf-fixing recorder circuit 28 is preheated. If the surf-fixing recorder circuit 28 is preheated in step S116, an intermediate procedure is performed (step S118). In step S116, recording is continued if on recording.

A controller 50 determines whether the next page is present (step S120). If YES in step S120, an intermediate procedure is executed (step S122). Also at this time, recording is continued if on recording. The controller 50 stores the received information in the memory circuit 24 (step S124).

The controller 50 determines whether a record allowable temperature is set (step S126). If YES, it is determined whether it is an initial record allowable temperature (step S128). If NO in step S126, the flow advances to step S134. If YES in step S128, the surf-fixing recorder circuit 28 is set to a record state (step S130). If NO in step S128, the surf-fixing recorder circuit 28 is already set in the record state, so that the flow advances to step S132. The controller 50 records the received information stored in the memory circuit in the reception order (step S132) and deletes the recorded information from the memory circuit 24. The controller 50 also determines whether reception of one page is ended (step S134). If YES in step S134, the flow returns to step S118; otherwise, the flow returns to step S124.

If NO in step S120, a post-procedure is executed (step S136). At this time, recording is continued if on recording. The controller 50 outputs a signal of level "0" onto a signal line 50a to turn off a CML (step S138). Thereafter, the flow advances to steps from step S104 of the above-described first embodiment.

As described above, in the facsimile transmission/reception control routine of the second embodiment, when the number of received sheets exceeds the number of sheets during communication, the received information can be recorded without waiting completion of communication.

Third Embodiment

A facsimile apparatus of the third embodiment will be described below. The facsimile apparatus of this embodiment has almost the same arrangement as that of the first embodiment, and only different points will be described. In the facsimile apparatus of this embodiment, assume that, when the number of received sheets stored in a memory circuit 24 exceeds the number of sheets for record start, reception for another communication is performed during recording. If the reception of another communication is ended during recording, information received at that time is also simultaneously recorded.

Figure 6:
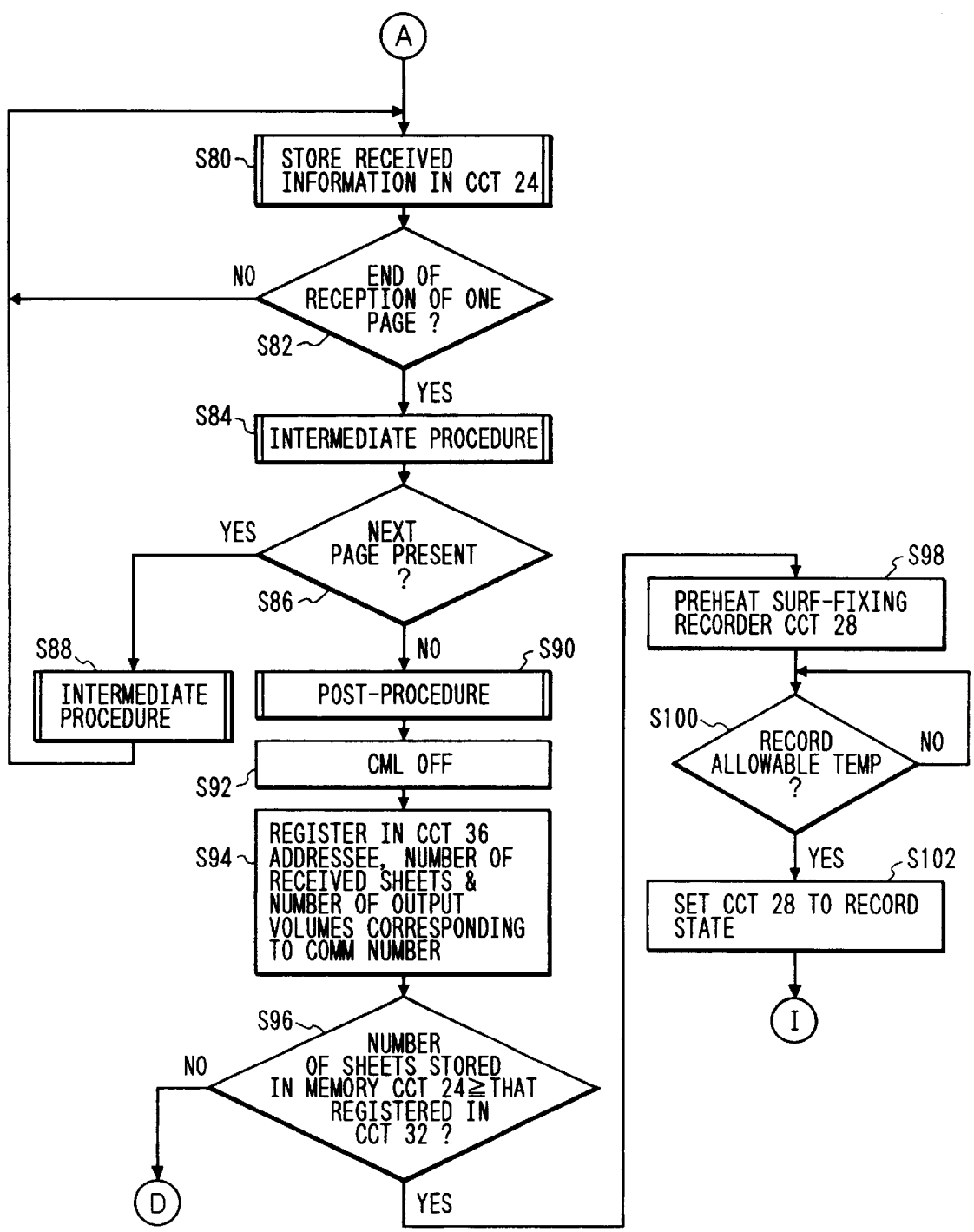
FIG. 6 is a flow chart showing part of a facsimile transmission/reception control routine of the third embodiment.
Figure 7:
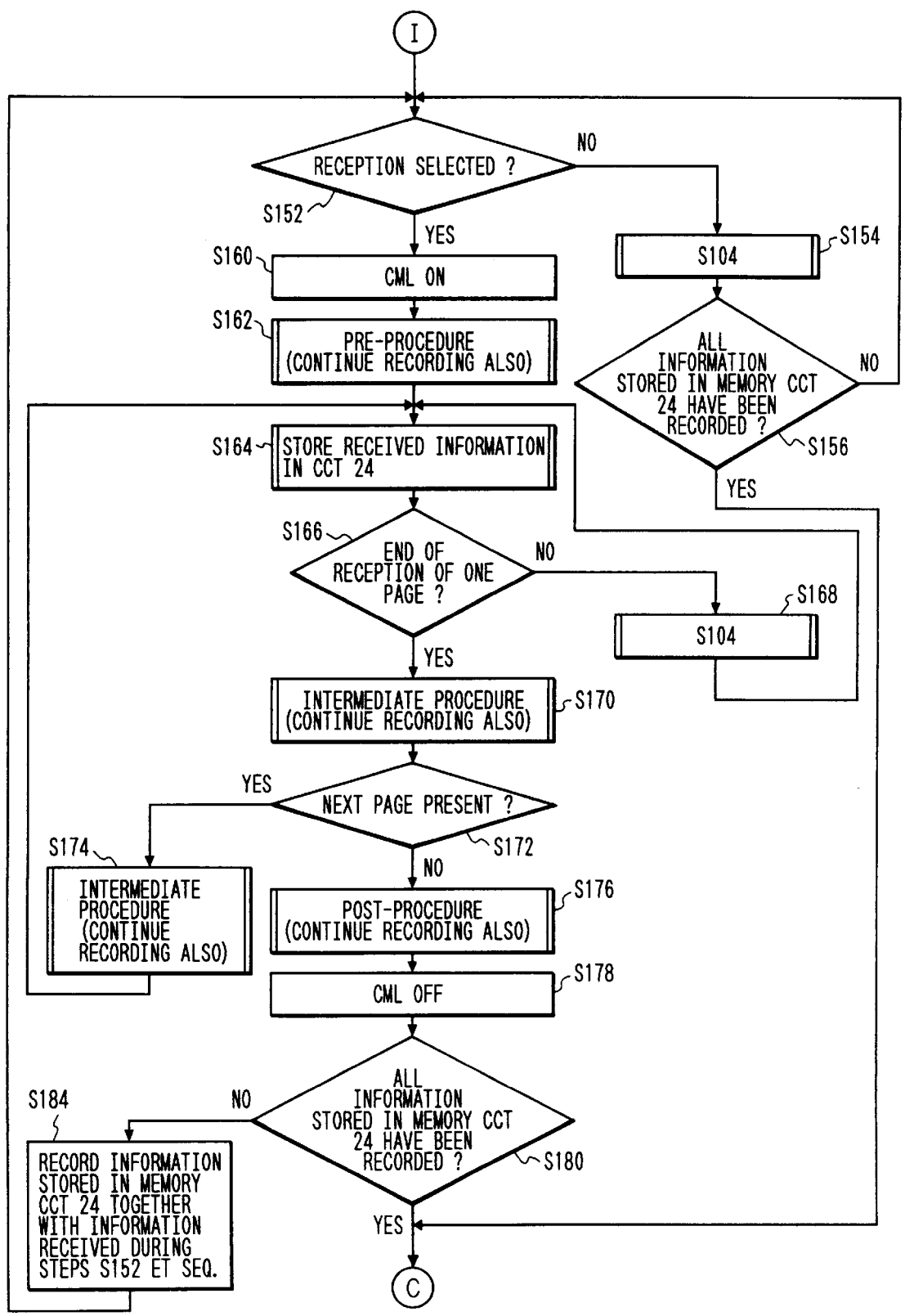
FIG. 7 is a flow chart showing part of the facsimile transmission/reception control routine subsequent to FIG. 6.

FIGS. 6 and 7 are flow charts showing part of a facsimile transmission/reception control routine of the third embodiment. This routine is realized by changing step S104 of the first embodiment. The same step numbers as those of the first embodiment represent the same processes, and a detailed description thereof will be omitted.

A controller 50 determines whether reception is selected (step S152). If NO in step S152, received information stored in the memory circuit 24 is recorded in the reception order, and the recorded information is deleted from the memory circuit 24 (step S154).

It is determined whether all the received information stored in the memory circuit 24 has been recorded (step S156). If YES in step S156, the flow returns to step S62 at the start of this routine. If NO in step S156, the flow returns to step S152.

If YES in step S152, a control signal of level "1" is output onto a signal line 50a to turn on a CML (step S160). A pre-procedure is then executed (step S162). At this time, recording is also continued.

The controller 50 stores the received information in the memory circuit 24 (step S164). In step S166, it is determined whether reception of one page is ended. If NO in step S166, the received information stored in the memory circuit 24 is recorded in the reception order (step S168). The recorded information is deleted from the memory circuit 24.

If YES in step S166, an intermediate procedure is executed (step S170). At this time, recording is also continued.

The controller 50 then determines whether the next page is present (step S172). If YES in step S172, an intermediate procedure is executed (step S174). At this time, recording is also continued. If NO in step S172, a post-procedure is executed (step S176). At this time, recording is also continued. The controller 50 outputs a signal of level "0" onto the signal line 50a to turn off the CML (step S178).

It is determined whether all the received information stored in the memory 24 has been recorded (step S180). If YES in step S180, the flow returns to step S62 at the start of this routine. If NO in step S180, information stored in the memory circuit 24 is recorded together with information received during execution of a routine of steps from step S152 (step S184). Thereafter, the flow returns to step S152 to perform the same process.

According to the facsimile transmission/reception control routine of this embodiment, the information received during recording after the information exceeds the number of sheets during communication can be simultaneously recorded.

Fourth Embodiment

A facsimile apparatus of the fourth embodiment will be described below. In the first embodiment, the received information stored in the memory circuit 24 is read out and recorded when the number of received sheets stored in the memory circuit 24 exceeds the number of sheets for record start. In this embodiment, assume that a plurality of volumes of received information are recorded. In this case, when the number of sheets corresponding to received information stored in a memory circuit 24 exceeds the number of sheets for record start, the received information is read out from the memory circuit 24 and recorded.

Figure 8:
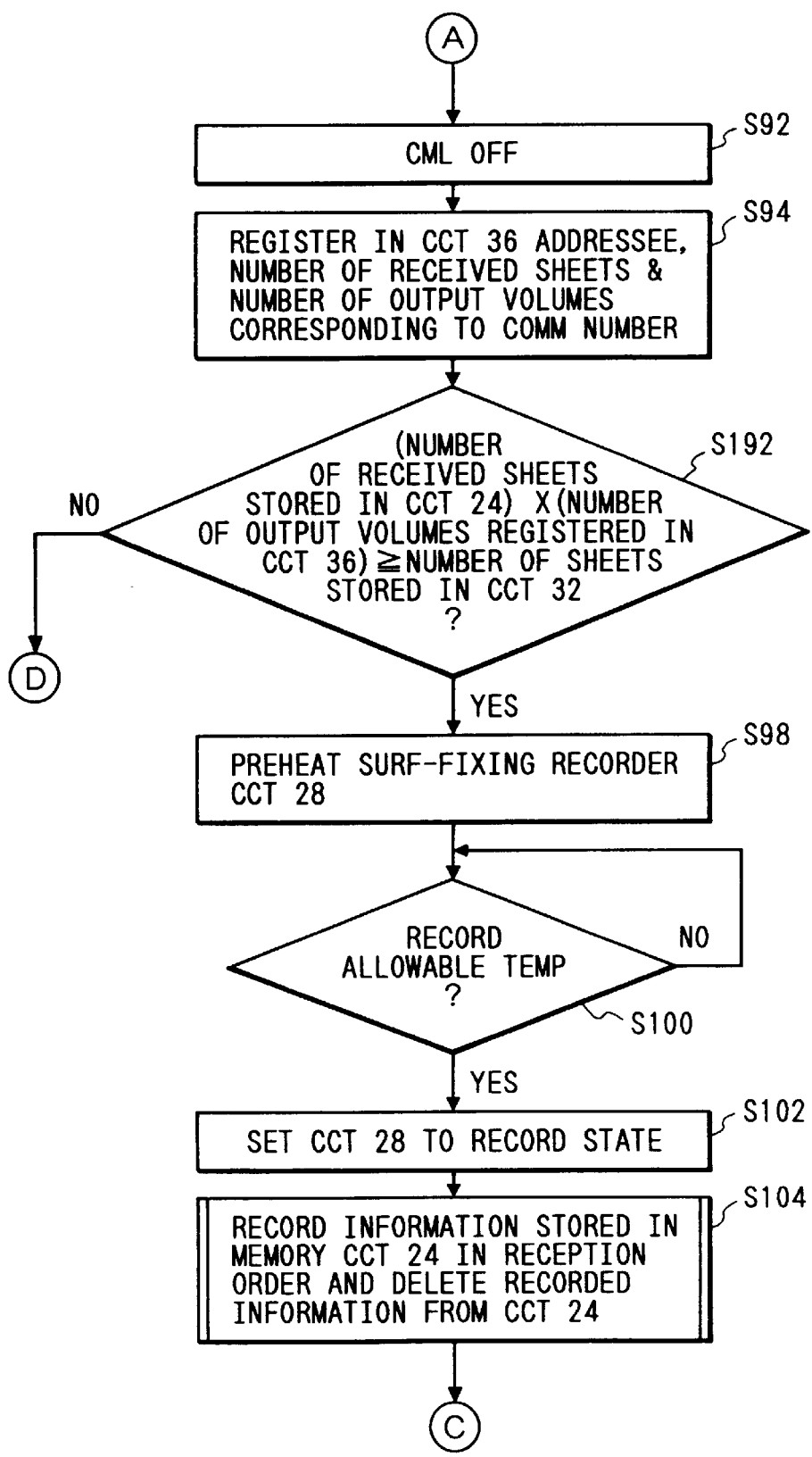
FIG. 8 is a flow chart showing part of a facsimile transmission/reception control routine of the fourth embodiment.

FIG. 8 is a flow chart showing part of a facsimile transmission/reception control routine of the fourth embodiment.

The facsimile transmission/reception control routine of this embodiment is realized by replacing step S96 of the first embodiment with step S192. The same step numbers as those of the first embodiment represent the same control, and a detailed description thereof will be omitted.

A controller 50 determines whether a product of the number of received sheets and the number of output volumes stored in the memory circuit 24 exceeds the number of sheets stored in a memory circuit (number of sheets for record start) 32 while considering the number of output volumes stored in a memory circuit (addressee, number of received sheets, and number of output volumes) 36 (step S192). If YES in step S192, the number of received sheets is recorded during steps from step S98. If NO in step S192, the flow returns to steps from step S68 to wait until reception is selected.

As described above, in the facsimile apparatus of this embodiment, recording can be performed while considering the number of output volumes.

Fifth Embodiment

A facsimile apparatus of the fifth embodiment will be described below. The facsimile apparatus of the fifth embodiment has a means for receiving a designation of an addressee from a sender station side. When the number of sheets of received information is to be recorded at once, recording is basically performed in the reception order. At this time, if pieces of received information for the same designated addressee are stored in a memory circuit 24, the reception order is ignored, and the pieces of received information for the same designated addressee are preferentially recorded, thereby recording information for each addressee.

Figure 9:
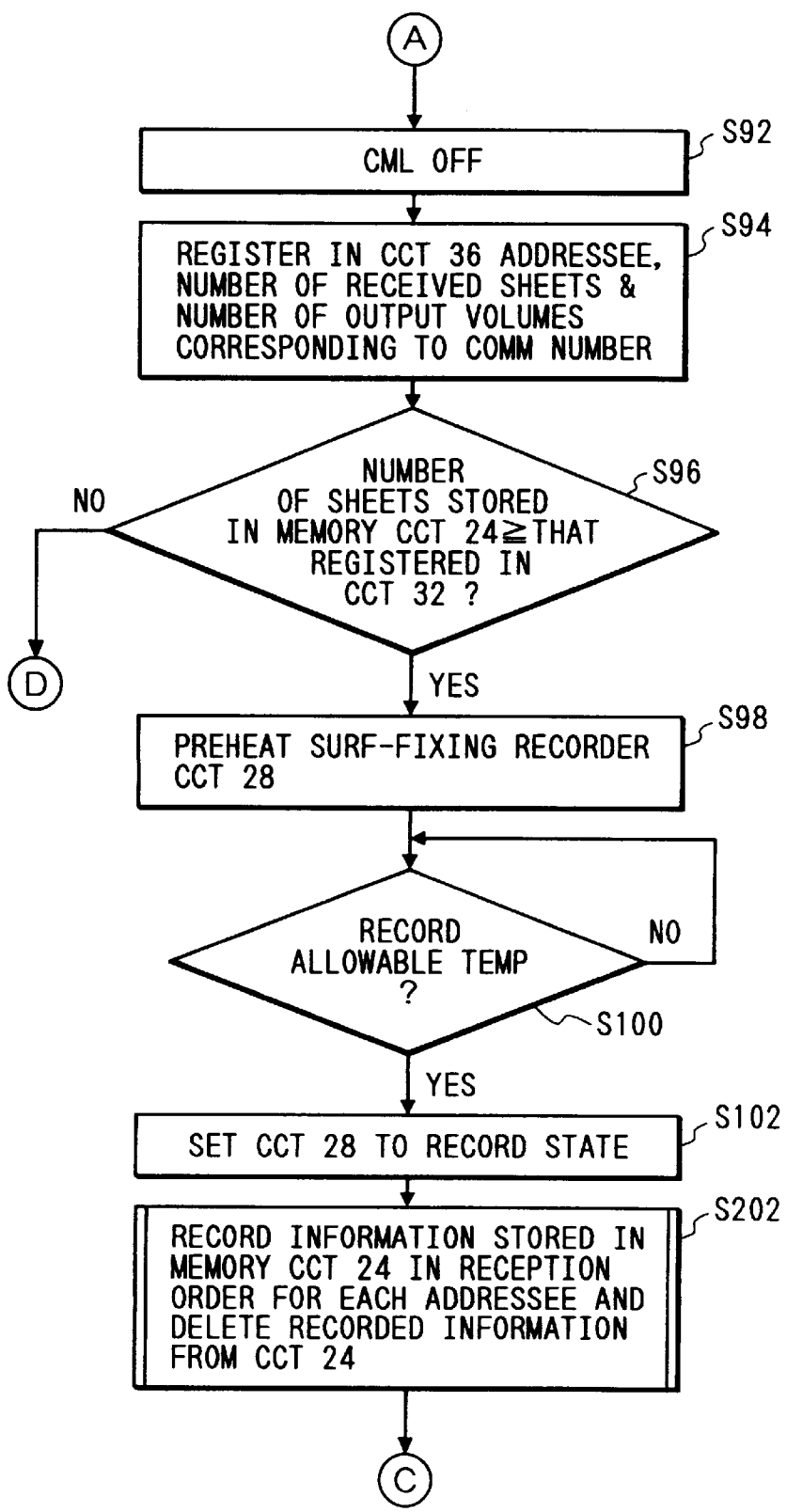
FIG. 9 is a flow chart showing part of a facsimile transmission/reception control routine of the fifth embodiment.

FIG. 9 is a flow chart showing part of a facsimile transmission/reception control routine of the fifth embodiment. This routine is achieved by replacing step S104 of the first embodiment with step S202. The same step numbers as those of the first embodiment represent the same control, and a detailed description thereof will be omitted.

A controller 50 records received information stored in the memory circuit 24 in the reception order for each addressee stored in a memory circuit (addressee, number of received sheets, and number of output volumes) 36 (step S202). At this time, the recorded information is deleted from the memory circuit 24. As described above, the facsimile apparatus of this embodiment can record information for each addressee.

Sixth Embodiment

A facsimile apparatus of the sixth embodiment will be described below. In the facsimile apparatus of the sixth embodiment, if received information exceeding the number of sheets is not stored in a memory circuit 24 after the elapse of a predetermined time period from completion of recording, the received information stored in the memory circuit 24 so far is forcibly recorded.

Figure 10:
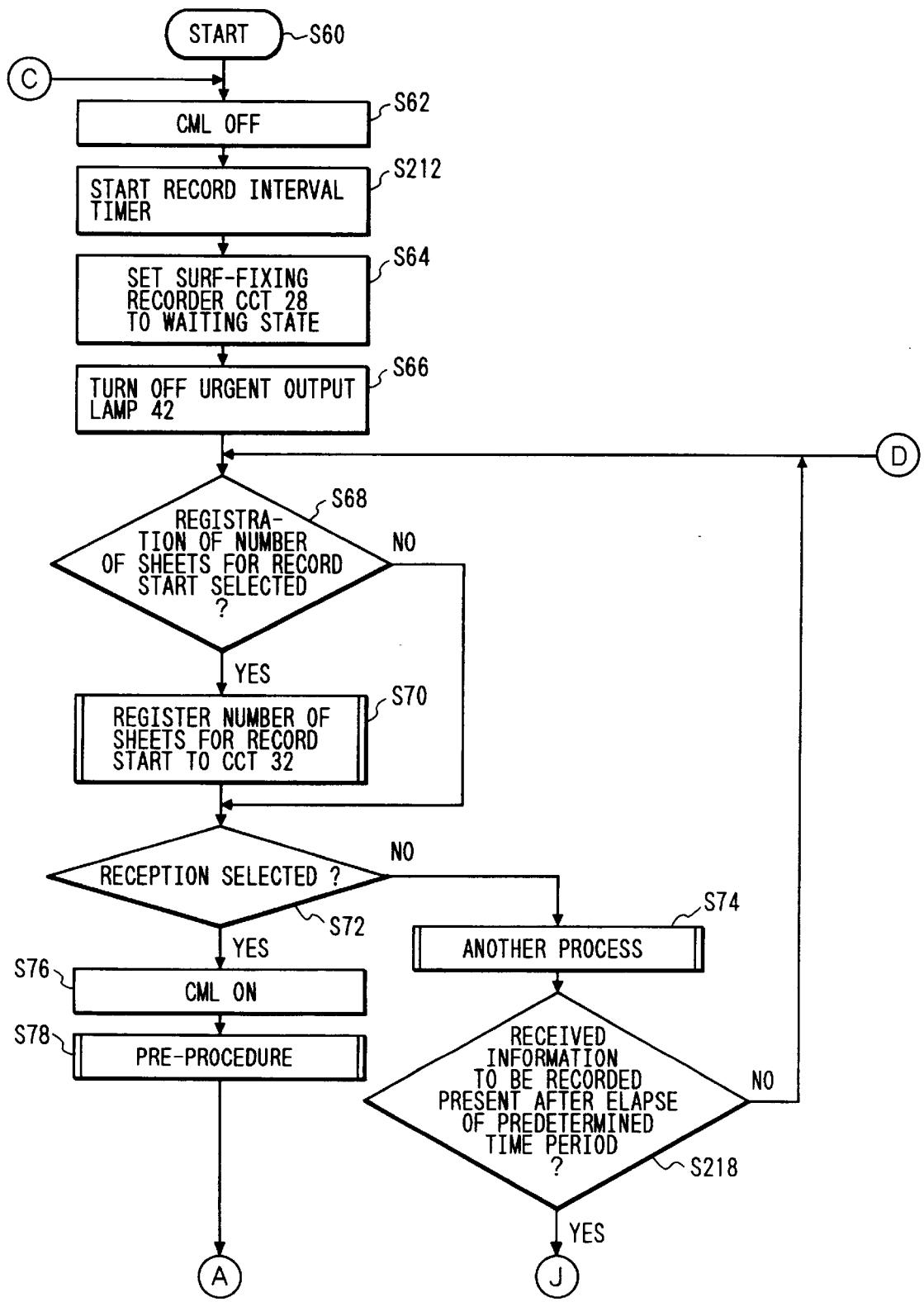
FIG. 10 is a flow chart showing part of a facsimile transmission/reception control routine of the sixth embodiment.

FIG. 10 is a flow chart showing part of a facsimile transmission/reception control routine of the sixth embodiment. In the description of the sixth embodiment, the same step numbers as those of the first embodiment represent the same control, and a detailed description thereof will be omitted. A controller 50 starts an incorporated timer to measure a time period from completion of recording (step S212).

The controller 50 determines whether received information to be recorded is present in the memory circuit 24 after the elapse of a predetermined time period (e.g., 60 minutes) counted by a record interval timer (step S218). If YES in step S218, the flow advances to steps from step S98 to record the information before the information exceeds the number of sheets. If NO in step S218, the flow returns to steps from step S68 to wait until reception is selected.

As described above, the facsimile apparatus of this embodiment can perform recording after the elapse of a predetermined time period before the received information exceeds the number of sheets.

Seventh Embodiment

An apparatus of the seventh embodiment will be described below. The facsimile apparatus of the seventh embodiment has a function (compulsory output button 38) of forcibly recording received information stored in a memory circuit 24. When this function is selected, all the received information stored in the memory circuit 24 is forcibly recorded.

Figure 11:
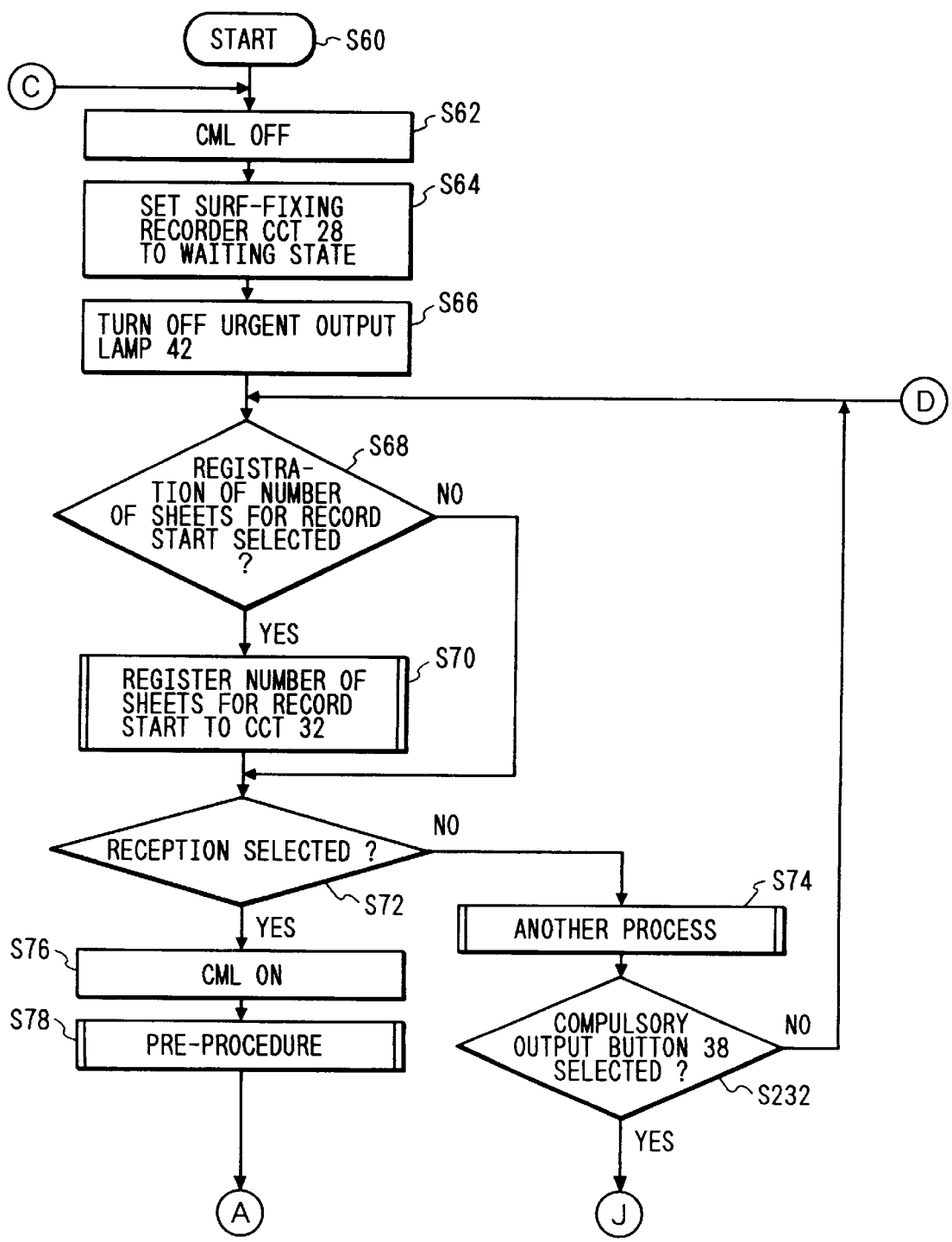
FIG. 11 is a flow chart showing part of a facsimile transmission/reception control routine of the seventh embodiment.

FIG. 11 is a flow chart showing part of a facsimile transmission/reception control routine of the seventh embodiment. In the seventh embodiment, the same step numbers as those of the first embodiment represent the same control, and a detailed description thereof will be omitted. A controller 50 receives a signal on a signal line 38a to determine whether the compulsory output button 38 is selected (step S232). If YES in step S232, the flow advances to steps from step S98 to forcibly output the received information stored in the memory circuit 24.

If NO in step S232, the flow advances to steps from step S68 to wait until reception is selected. As described above, the facsimile apparatus of this embodiment can forcibly record the received information before the information exceeds the number of sheets.

Eighth Embodiment

A facsimile apparatus of the eighth embodiment will be described below. The facsimile apparatus of the eighth embodiment has a means (urgent output button 40) for designating urgent output of received information on a receiver station side from a sender station side. When urgent output is selected, the facsimile apparatus on the receiver station side is informed of it by a protocol signal. The facsimile apparatus on the receiver station side immediately outputs the received information with the urgent output designation, and at the same time, records all the received information stored in a memory circuit 24 during recording of the received information. In recording, the facsimile apparatus on the receiver station side preferentially records the received information with the urgent output designation.

Figure 12:
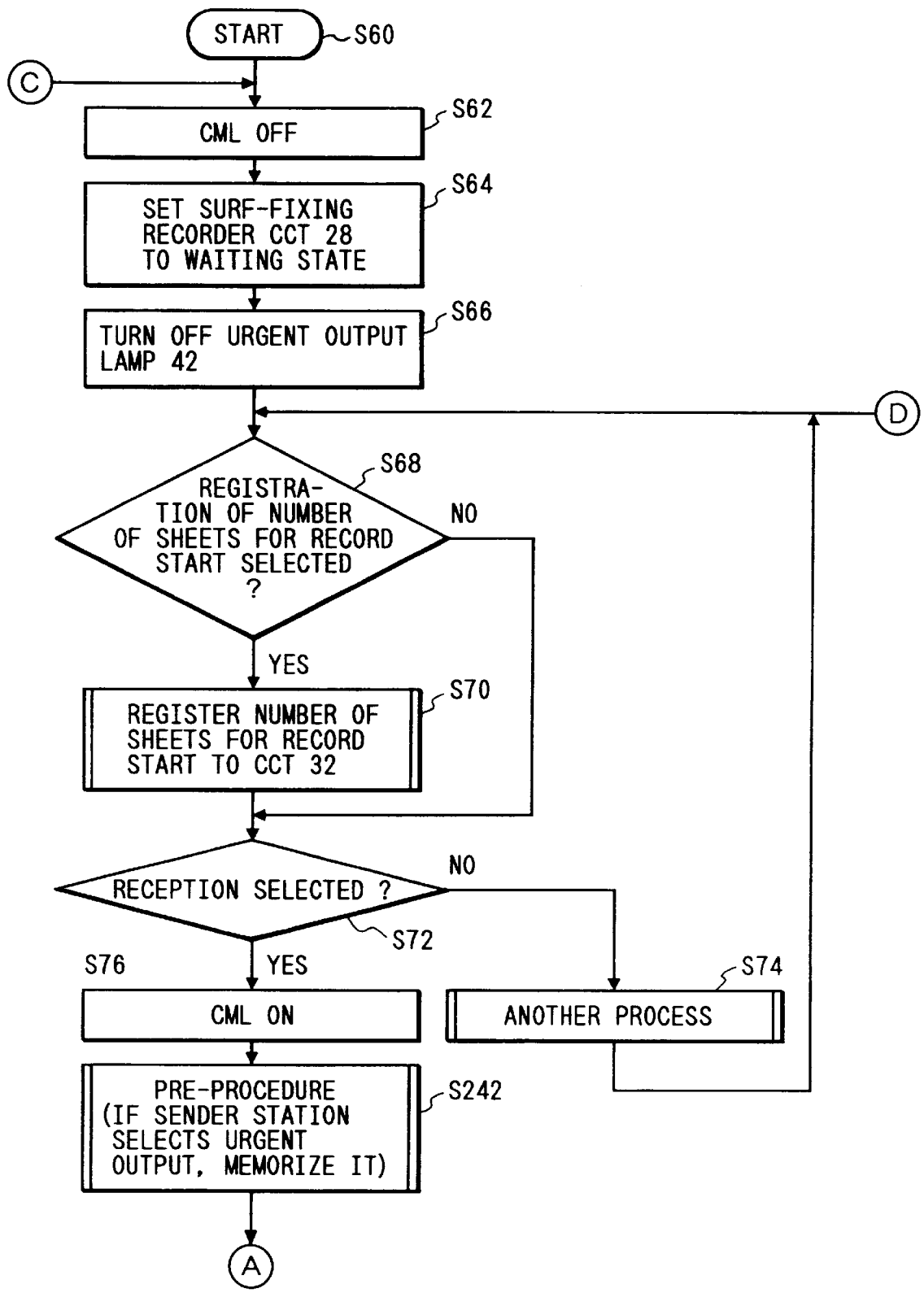
FIG. 12 is a flow chart showing part of a facsimile transmission/reception control routine of the eighth embodiment.
Figure 13:
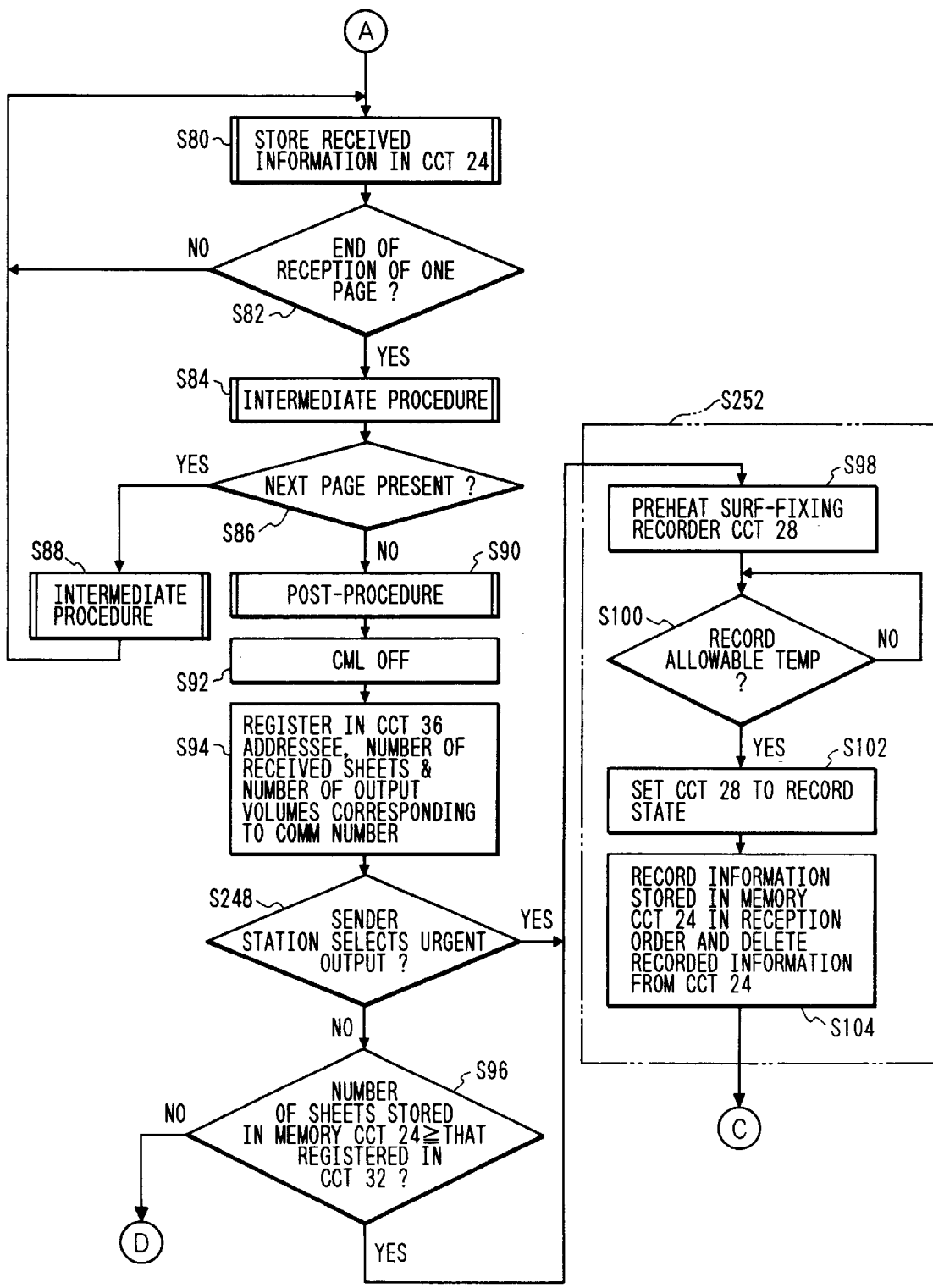
FIG. 13 is a flow chart showing part of the facsimile transmission/reception control routine subsequent to FIG. 12.

FIGS. 12 and 13 are flow charts showing part of a facsimile transmission/reception control routine of the eighth embodiment. This routine is realized by replacing step S78 of the first embodiment with step S242, and steps S96 to S104 of the first embodiment with steps S248 and S252. The same step numbers as those of the first embodiment represent the same control, and a detailed description thereof will be omitted.

At the start of reception, a controller 50 executes a pre-procedure (step S242). At this time, if the facsimile apparatus on the sender station side selects urgent output, and a command for urgent output is received, it is memorized.

Upon completion of reception, the controller 50 determines whether the facsimile apparatus on the sender station side selects urgent output, and the command for urgent output is received (step S248). If YES in step S248, processes in steps from step S98 are executed to preferentially record the received information with the urgent output designation (step S252). If NO in step S248, the flow advances to steps from step S96. As described above, the facsimile apparatus of this embodiment can perform recording in accordance with a command for urgent output from the facsimile apparatus on the sender station side.

Ninth Embodiment

Figure 14:
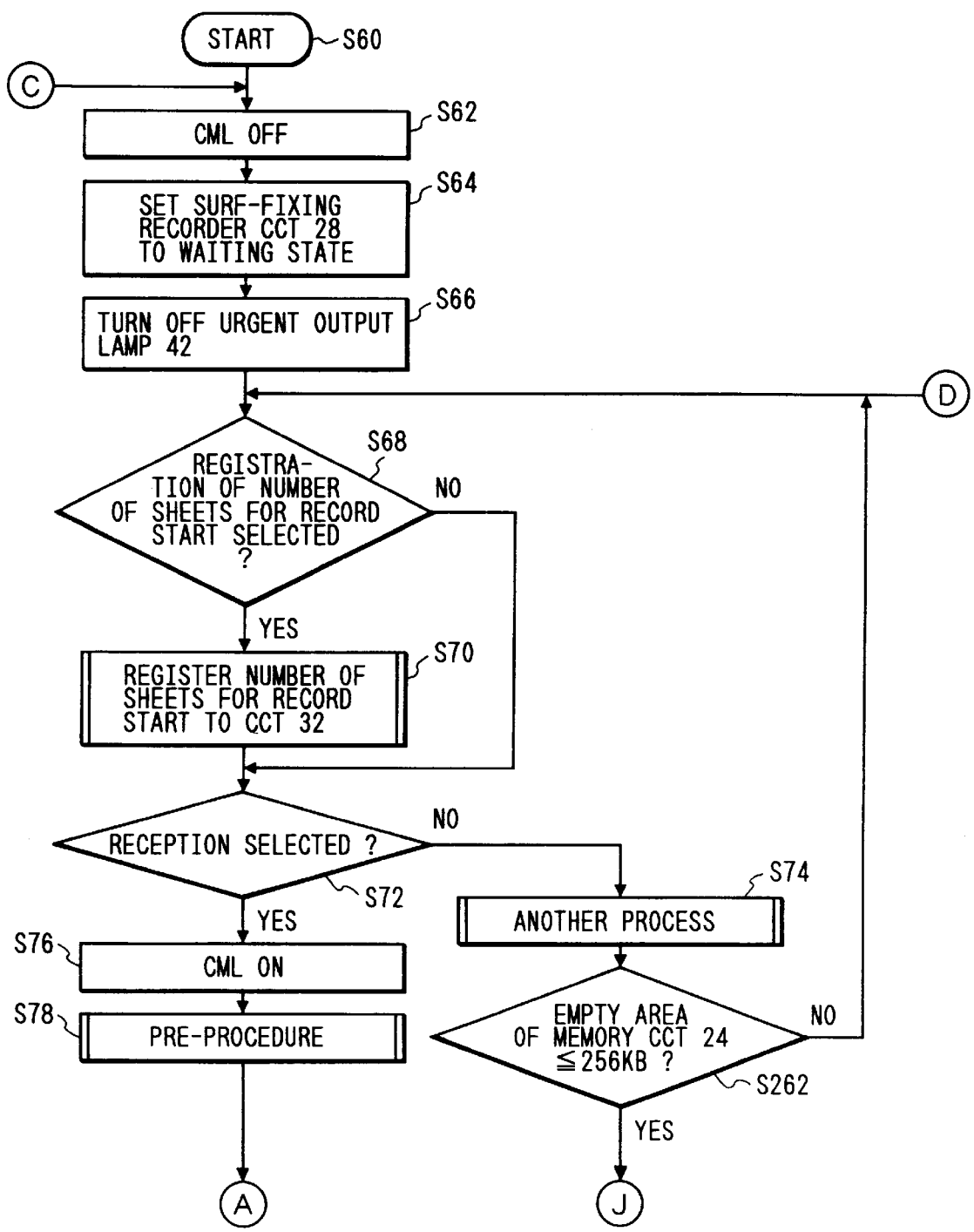
FIG. 14 is a flow chart showing part of a facsimile transmission/reception control routine of the ninth embodiment.

A facsimile apparatus of the ninth embodiment will be described below. In the facsimile apparatus of the ninth embodiment, if the empty area of a memory circuit 24 becomes smaller before the number of recorded sheets exceeds the number of sheets, all received information stored in the memory circuit 24 is recorded. FIG. 14 is a flow chart showing part of a facsimile transmission/reception control routine of the ninth embodiment. The same step numbers as those of the first embodiment represent the same control, and a detailed description thereof will be omitted. A controller 50 receives a signal on a signal line 24b from the memory circuit 24 to determine whether the empty area of the memory circuit 24 is smaller than 256 kbits (step S262). If YES in step S262, processes in steps from step S98 are executed to record received information stored in the memory circuit 24.

If NO in step S262, the flow returns to steps from step S68 to wait until reception is selected.

As described above, the facsimile apparatus of this embodiment can perform recording when the empty area of the memory circuit 24 becomes smaller.

10th Embodiment

A facsimile apparatus of the 10th embodiment will be described below. The facsimile apparatus of the 10th embodiment can be applied in the first to sixth embodiments and has an ambient light intensity detector circuit 44. More specifically, since no operator recognizes any image while it is dark, information stored in a memory circuit 24 is not recorded.

Figure 15:
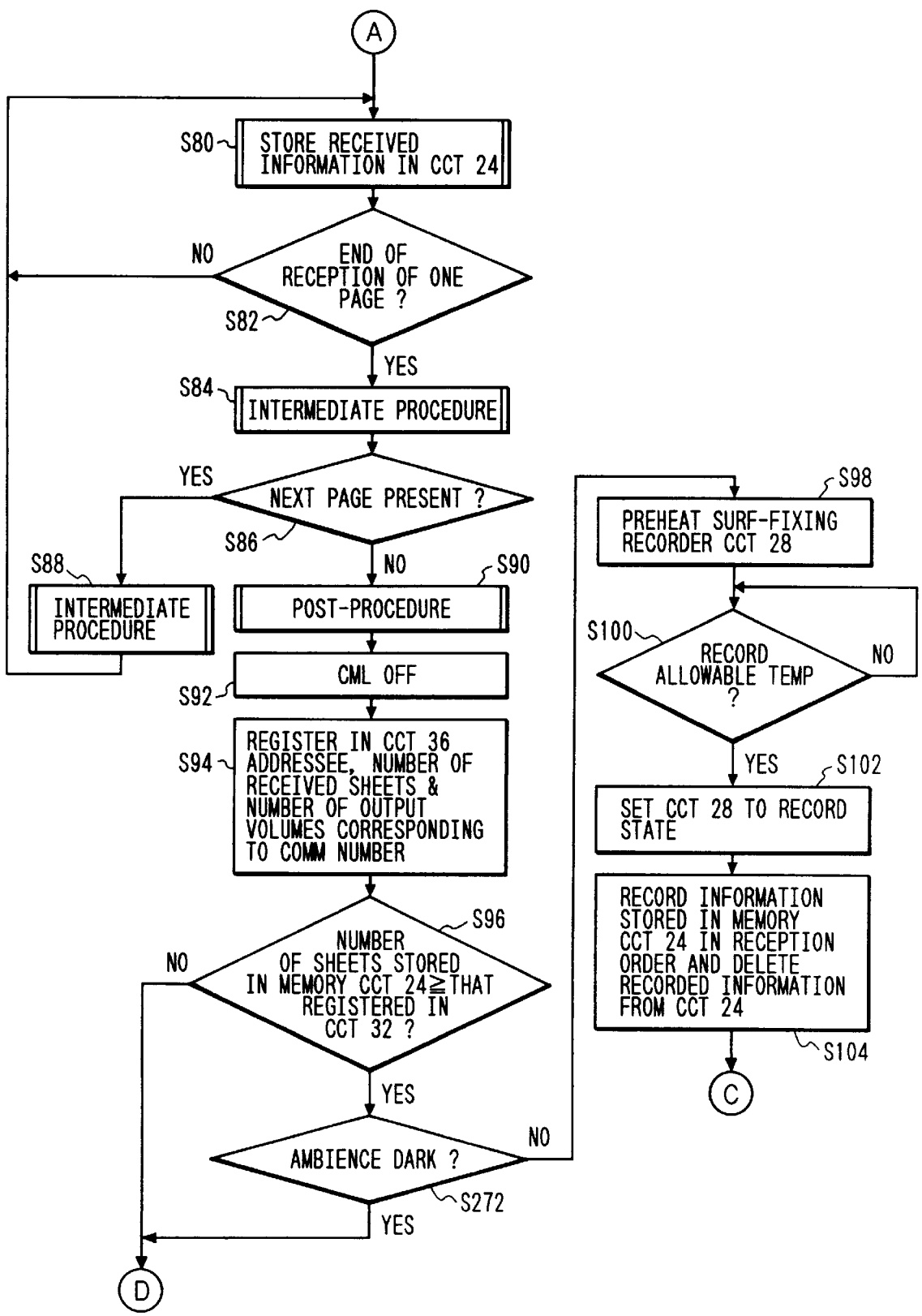
FIG. 15 is a flow chart showing part of a facsimile transmission/reception control routine of the 10th embodiment.

FIG. 15 is a flow chart showing part of a facsimile transmission/reception control routine of the 10th embodiment. The same step numbers as those of the first embodiment represent the same control, and a detailed description thereof will be omitted. A controller 50 receives a signal on a signal line 44a from the ambient light intensity detector circuit 44 to determine whether it is dark (step S272). If YES in step S272, it is determined that nobody is present in the ambience, and processes in steps from step S68 are executed to wait until reception is selected. If NO in step S272, it is determined that anybody is present in the ambience, and processes in steps from step S98 are executed to perform recording. As described above, the facsimile apparatus of this embodiment performs recording while determining the ambient light intensity.

11th Embodiment

A facsimile apparatus of the 11th embodiment will be described below. The facsimile apparatus of the 11th embodiment has a room temperature detector circuit 46 for detecting an ambient temperature while the facsimile apparatus of the 10th embodiment detects the ambient light intensity. More specifically, if the room temperature is high, it is determined that anybody is present in the ambience. If the room temperature is low, it is determined that nobody is present in the ambience. In a facsimile transmission/reception control routine at this time, a room temperature can be determined in step S272 of the 11th embodiment.

12th Embodiment

Figure 16:
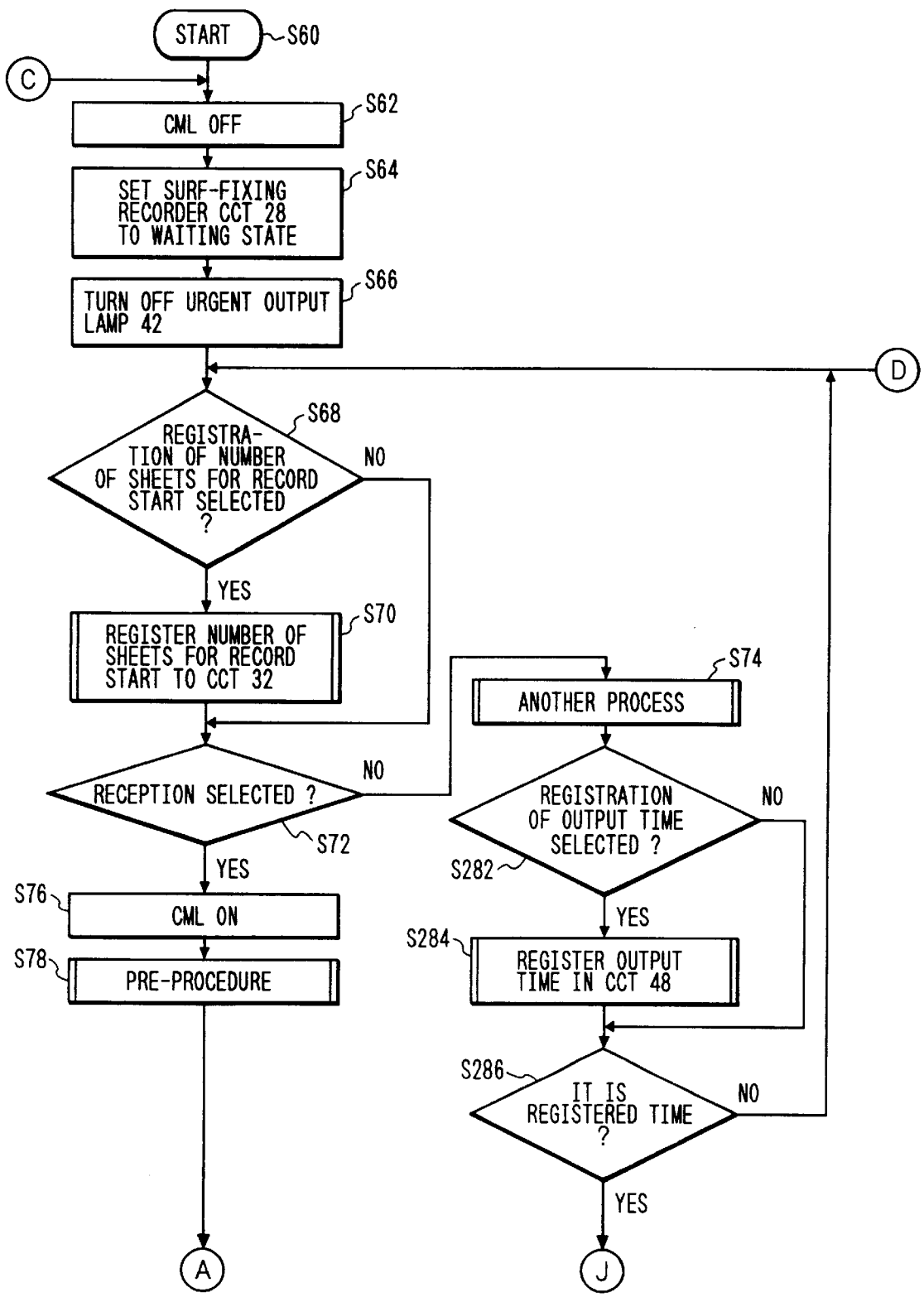
FIG. 16 is a flow chart showing part of a facsimile transmission/reception control routine of the 12th embodiment.

A facsimile apparatus of the 12th embodiment will be described below. In the facsimile apparatus of the 12th embodiment, a plurality of times for outputting received information are registered. When it is the registered time, all the received information stored in a memory circuit 24 so far is output. FIG. 16 is a flow chart showing part of a facsimile transmission/reception control routine of the 12th embodiment. The same step numbers as those of the first embodiment represent the same control, and a detailed description thereof will be omitted. A controller 50 determines whether registration of an output time is selected (step S282). If YES in step S282, the output time is registered in an output time registration circuit 48 (step S284). If NO in step S282, the flow advances to step S286.

In step S286, a signal is received from the output time registration circuit 48 to determine whether it is the registered time for outputting the received information (step S286). If YES in step S286, processes in steps from step S98 are executed to perform recording. If NO in step S286, the flow returns to step S68 to wait until reception is selected.

As described above, in this routine, recording can be performed at the registered time.

As has been described above, according to the facsimile apparatus of the present invention, preheat for recording is performed once, and information exceeding the number of sheets is recorded at once, thereby saving power.

What is claimed is:

1. A facsimile apparatus which records received information on a recording sheet, comprising:

recording means for recording the received information on the recording sheet, said recording means having an active mode and a standby mode using less electric power than the active mode;

storing means for, with said recording means in the standby mode, storing the received information without recording it by said recording means;

detecting means for detecting an amount of time that has elapsed starting from a first reception time of the received information; and control means for changing a mode of said recording means from the standby mode to the active mode to cause said recording means to record the stored information, in accordance with a detection by said detecting means.

2. An apparatus according to claim 1, where said detecting means detects whether or not any of the received information has been stored in the storing means after receipt for an elapsed time for at least a predetermined time period and which has not been recorded by said recording means, and said control means changes the mode from the standby mode to the active mode to cause said recording means to record any stored information that was stored for at least the predetermined time period and was not recorded by said recording means.

3. An apparatus according to claim 1, wherein said recording means records the stored information in an order of reception.

4. An apparatus according to claim 3, wherein said recording means includes addressee designating means for designating an addressee and preferentially records the stored information for the addressee designated by said addressee designating means.

5. An apparatus according to claim 1, where said detecting means detects whether or not any of the received information has been stored in the storing means after receipt for an elapsed time for at least a predetermined time period, and said control means changes the mode from the standby mode to the active mode to cause said recording means to record any stored information that was stored for at least the predetermined time period.

6. An apparatus according to claim 1, further comprising designating means for designating compulsory recording of the stored information stored in said storing means, wherein the stored information stored in said storing means is forcibly recorded upon designation by said designating means.

7. An apparatus according to claim 1, further comprising urgent output command receiving means for receiving a command for urgent output from a facsimile apparatus on a sender station side, wherein said recording means records the stored information stored in said storing means, including any information received with the command for urgent output, upon reception of the command for urgent output from the facsimile apparatus on the sender station side.

8. An apparatus according to claim 7, wherein said recording means preferentially records the information received with the command for urgent output.

9. An apparatus according to claim 1, further comprising time registration means for registering a time for outputting the stored information, wherein all the stored information in said storing means is recorded at the registered time.

10. An apparatus according to claim 1, further comprising light intensity detecting means for detecting a local ambient light intensity, wherein the stored information in said storing means is not recorded when the detected ambient light intensity is below a threshold.

11. An apparatus according to claim 1, further comprising room temperature detecting means for detecting a local room temperature, wherein the stored information in said storing means is not recorded when the room temperature detected by said room temperature detecting means is below a threshold.

12. An apparatus according to claim 1, further comprising:
second detecting means for detecting whether or not an amount of the stored information in said storing means has reached a predetermined value, the predetermined value being settable to be equal to or less than a maximum capacity of pages of said storage means,
wherein said control means changes the mode of said recording means from the standby mode to the active mode to record the stored information in accordance with a detection result of the first-mentioned detecting means before a detection by said second detecting means that the number of pages of the stored information has reached the predetermined value.

13. An apparatus according to claim 12, further comprising a number of volumes setting means for setting a number of volumes of the received information to be recorded by said recording means, wherein said second detecting means detects that the number of pages of the stored information has reached the predetermined value on the basis of the set number of volumes.

14. An apparatus according to claim 13, wherein the amount of stored information is a number of pages of stored information.

15. An apparatus according to claim 12, wherein all the received information stored in said storing means is recorded when an empty area of said storing means becomes smaller than a predetermined amount before the number of pages of the stored information reaches the predetermined value.

16. An apparatus according to claim 15, wherein the amount of stored information is a number of pages of stored information.

17. An apparatus according to claim 12, wherein the amount of stored information is a number of pages of stored information.

18. A facsimile method which records received information on a recording sheet, comprising the steps of:
recording the received information on the recording sheet using recording means having an active mode and a standby mode using less electric power than the active mode;
with the recording means in the standby mode, storing the received information in a memory without recording it by the recording means;
detecting an amount of time that has elapsed starting from a first reception time of the received information; and
changing a mode of the recording means from the standby mode to the active mode to cause said recording step to record the stored information, in accordance with a detection by said detecting step.

19. A method according to claim 18, wherein said recording step records the stored information in an order of reception.

20. A method according to claim 19, wherein said recording step includes an addressee designating step for designating an addressee and preferentially records the stored information for the addressee designated by said addressee designating step.

21. A method according to claim 18, further comprising a designating step for designating compulsory recording of the stored information stored in said storing step, wherein the stored information stored in said storing step is forcibly recorded upon designation by said designating step.

22. A method according to claim 18, further comprising an urgent output command receiving step for receiving a command for urgent output from a facsimile apparatus on a sender station side, wherein said recording step records the stored information stored in said storing step, including any information received with the command for urgent output, upon reception of the command for urgent output from the facsimile apparatus on the sender station side.

23. A method according to claim 22, wherein said recording step preferentially records the information received with the command for urgent output.

24. A method according to claim 18, where said detecting step detects whether or not any of the received information has been stored in the memory after receipt for an elapsed time for at least a predetermined time period, and said changing step changes the mode from the standby mode to the active mode to cause the recording means to record any stored information that was stored for at least the predetermined time period.

25. A method according to claim 18, further comprising a light intensity detecting step for detecting a local ambient light intensity, wherein the stored information stored in said storing step is not recorded when the detected ambient light intensity is below a threshold.

26. A method according to claim 18, further comprising a room temperature detecting step for detecting a local room temperature, wherein the stored information stored in said storing step is not recorded when the room temperature detected by said room temperature detecting step is below a threshold.

27. A method according to claim 18, further comprising a time registration step for registering a time for outputting the stored information, wherein all the stored information stored in said storing step is recorded at the registered time.

28. A method according to claim 18, further comprising:

a second detecting step of detecting whether or not an amount of the stored information in the memory has reached a predetermined value, the predetermined value being settable to be equal to or less than a maximum capacity of pages of the memory, wherein said changing step changes the mode of the recording means from the standby mode to the active mode to record the stored information in accordance with a detection result of the first-mentioned detecting step before a detection by said second detecting step that the number of pages of the stored information has reached the predetermined value.

29. A method according to claim 28, wherein all the received information stored in said storing step is recorded when an empty area of the memory becomes smaller than a predetermined amount before the number of pages of the stored information reaches the predetermined value.

30. A method according to claim 29, wherein the amount of stored information is a number of pages of stored information.

31. A method according to claim 28, further comprising a number of volumes setting step for setting a number of volumes of the received information to be recorded by said recording step, wherein said detecting step detects that the number of pages of the stored information has reached the predetermined value on the basis of the set number of volumes.

32. A method according to claim 31, wherein the amount of stored information is a number of pages of stored information.

33. A method according to claim 28, wherein the amount of stored information is a number of pages of stored information.

34. A method according to claim 18, where said detecting step detects whether or not any of the received information has been stored in the memory after receipt for an elapsed time for at least a predetermined time period, and which has not been recorded by the recording means, and said changing step changes the mode from the standby mode to the active mode to cause the recording means to record any stored information that was stored for at least the predetermined time period and was not recorded by the recording means.

* * * * *